(12) United States Patent
St-Laurent

(10) Patent No.: US 10,371,269 B2
(45) Date of Patent: Aug. 6, 2019

(54) SLEEVE FOR USE IN A PINCH VALVE

(71) Applicant: Proto Fusion, Inc., Lanoraie (CA)

(72) Inventor: Patrice St-Laurent, Lanoraie (CA)

(73) Assignee: PROTO FUSION INC., Lanoraie (CA)

( * ) Notice: Subject to any disclaimer, the term of this patent is extended or adjusted under 35 U.S.C. 154(b) by 0 days.

(21) Appl. No.: 15/568,322

(22) PCT Filed: May 16, 2017

(86) PCT No.: PCT/CA2017/050590
§ 371 (c)(1),
(2) Date: Oct. 20, 2017

(87) PCT Pub. No.: WO2017/197513
PCT Pub. Date: Nov. 23, 2017

(65) Prior Publication Data
US 2019/0063620 A1    Feb. 28, 2019

Related U.S. Application Data

(60) Provisional application No. 62/338,106, filed on May 18, 2016.

(51) Int. Cl.
*F16K 7/04*    (2006.01)
(52) U.S. Cl.
CPC ..................... *F16K 7/04* (2013.01)
(58) Field of Classification Search
CPC ............. F16K 7/07; F16K 7/04; Y10T 137/60
(Continued)

(56) References Cited

U.S. PATENT DOCUMENTS 3,007,416 A    11/1961    Childs
3,826,461 A    7/1974    Summerfield et al.
(Continued)

FOREIGN PATENT DOCUMENTS

GB    1352461    5/1974
GB    1388294    3/1975
(Continued)

OTHER PUBLICATIONS

English Abstract of CN2641404(Y), "Pneumatic tube clampling valve", published on Sep. 15, 2004.
(Continued)

*Primary Examiner* — Patrick F Brinson
(74) *Attorney, Agent, or Firm* — Bereskin & Parr LLP/S.E.N.C.R.L.,s.r.l.

(57) ABSTRACT

A sleeve for use in a pinch valve, the sleeve comprising a resilient and at least substantially tubular element having opposite ends and capable of being compressed for reducing or restricting a flow therethrough; a pair of annular end flanges, each annular end flange being mounted on each of the opposite ends and extending radially outwardly from the tubular element for sealingly engaging a valve rim; a pair of annular grooves, each of the annular grooves being defined between the annular end flange and an annular projection, the annular projection extending radially outwardly from the tubular element, and a pair of annular railings inserted within the annular grooves, the annular railings being dimensioned for receiving a valve flange for retaining engagement therewith and comprising a railing base having an innermost diameter and an outermost diameter, the outermost diameter being greater than an outermost diameter of a section of the tubular element adjacent to the annular projection.

7 Claims, 6 Drawing Sheets

(58) Field of Classification Search
USPC ........ 138/109; 137/375, 315.07; 251/4, 5, 7, 251/358, 252, 284, 292
See application file for complete search history.

(56) References Cited

U.S. PATENT DOCUMENTS

| | | | |
|---|---|---|---|
| 4,108,418 | A | 8/1978 | Ensign et al. |
| 4,125,125 | A | 11/1978 | Ezekoye et al. |
| 4,135,550 | A | 1/1979 | Anderson |
| 4,534,224 | A | 8/1985 | Raftis |
| 4,630,635 | A | 12/1986 | Bernstein et al. |
| 4,682,755 | A | 7/1987 | Bernstein et al. |
| 4,688,597 | A | 8/1987 | Clarkson et al. |
| 4,811,758 | A * | 3/1989 | Piper .................... E21B 21/106 137/844 |
| 4,824,072 | A | 4/1989 | Zakai |
| 4,846,442 | A | 7/1989 | Clarkson et al. |
| 4,899,783 | A | 2/1990 | Yusko, Jr. et al. |
| 5,338,006 | A | 8/1994 | McCutcheon et al. |
| 5,535,983 | A | 7/1996 | Hohermuth |
| 5,549,793 | A | 8/1996 | Hellstrom et al. |
| 5,992,818 | A | 11/1999 | Jones et al. |
| 6,736,163 | B1 | 5/2004 | Partanen |
| 8,894,035 | B2 | 11/2014 | Ruelland et al. |
| 2014/0077107 | A1 | 3/2014 | Berwanger et al. |

FOREIGN PATENT DOCUMENTS

| | | |
|---|---|---|
| GB | 1507676 | 4/1978 |
| GB | 1569827 | 6/1980 |
| GB | 2410538 | 8/2005 |
| WO | 2005071295 | 8/2005 |

OTHER PUBLICATIONS

English Abstract of CN103615566(A), "Pneumatic control valve", published on Mar. 5, 2014.
English Abstract of CN204477374(U), "Pneumatic pinch valve", published on Jul. 15, 2015.
English Abstract of DE2456166(A1), "Detachably connecting flexible plastic pipes—having inner connecting sleeve and Duter sleeve segments with bolts engaging inner sleeve", published on Aug. 12, 1976.
English Abstract of DE19612237(A1), "Valve for suction systems, especially in dental laboratory workplace", published on Oct. 2, 1996.
English Abstract of JP5544483(B2), "Sleeve for pinch valve", published on Jul. 9, 2014.
English Abstract of JPH08312811(A), "Pinch valve", published on Nov. 26, 1996.
English Abstract of JPS343071(A), "Pinch valve", published on Feb. 24, 1988.

* cited by examiner

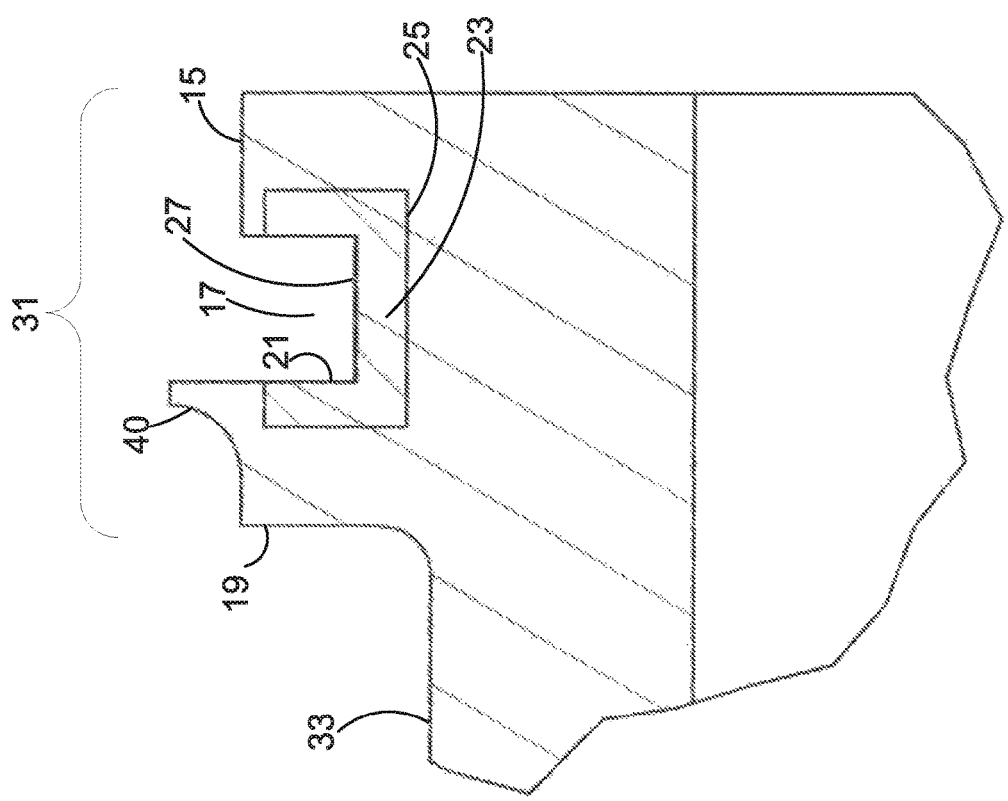

SLEEVE FOR USE IN A PINCH VALVE

CROSS-REFERENCE TO RELATED APPLICATIONS

The present application claims priority to U.S. provisional application No. 62/338,106, filed on May 18, 2016. This document is hereby incorporated by reference in its entirety.

TECHNICAL FIELD

The present disclosure relates to pinch valves, and more particularly to locking systems for pinch valves and pinch valve sleeves.

BACKGROUND OF THE DISCLOSURE

Pinch valves are used in various fields including the oil, gas and mining industries. The pinch valve generally comprises a valve body in which a tubular sleeve made of a resilient material is inserted. Upon pinching action, pressure is applied to the sleeve which restricts or reduces the flow of material therethrough. The sleeve is secured into place by retaining mechanisms on each end of the sleeve.

There is a need for a locking system for securely retaining the sleeve within the pinch valve thus for preventing movement therebetween. There is also a need for a sealing mechanism for preventing leaking of material between the sleeve and the pinch valve.

SUMMARY OF THE DISCLOSURE

According to one aspect, there is provided a sleeve for use in a pinch valve, the sleeve comprising:
- a resilient and at least substantially tubular element having opposite ends and capable of being compressed for reducing or restricting a flow therethrough;
- a pair of annular end flanges, each annular end flange being mounted on each of the opposite ends and extending radially outwardly from the tubular element for sealingly engaging a valve rim;
- a pair of annular grooves, each of the annular grooves being defined between the annular end flange and an annular projection, the annular projection extending radially outwardly from the tubular element, and
- a pair of annular railings inserted within the annular grooves, the annular railings being dimensioned for receiving a valve flange for retaining engagement therewith and comprising a railing base having an innermost diameter and an outermost diameter, the outermost diameter being greater than an outermost diameter of a section of the tubular element adjacent to the annular projection.

In one embodiment, the innermost diameter and the outermost diameter of the railing base are greater than the outermost diameter of the section of the tubular element adjacent to the annular projection.

In another embodiment, the annular projection further comprises an annular lip member extending radially outwardly from the annular projection for sealingly engaging the valve rim.

In an embodiment, the annular lip member is beveled away from the annular groove.

In an embodiment, the annular railing is made of metal.

In a further embodiment, the tubular element is made of a composition comprising elastomers, polymers, reinforcing fibers, and mixtures thereof.

In yet another embodiment, the tubular element further comprises a reinforced annular section.

BRIEF DESCRIPTION OF DRAWINGS

In the following drawings, which represent by way of example only, various embodiments of the disclosure:

FIG. 6 is an enlarged view of the end portion of the tubular element as identified in FIG. 5, in accordance with at least one embodiment.

DETAILED DESCRIPTION OF VARIOUS EMBODIMENTS

Further features and advantages will become more readily apparent from the following description of various embodiments as illustrated by way of examples only and in a non-limitative manner.

As used herein, the term "tubular element" refers to a generally cylindrically shaped element having a hollow interior suitable for the passage of material. The term "tubular element" also includes elements comprising sections with varying diameters and shapes. For example, when the tubular element comprises a reinforced annular section in its mid-body section, it has sections with varying diameters.

As used herein, the term "valve rim" means the portion of the pinch valve which cooperates with the retaining section of the tubular element. For example, the valve rim can cooperate with the annular end flange, the annular groove, the annular railing, the annular projection and/or the section of the tubular element adjacent to the annular projection. The valve rim also comprises a valve flange extending outwardly and dimensioned to mate with the annular groove and annular railing.

Accordingly, it is herein described sleeves for use in a pinch valve. The person skilled in the art will readily understand that the presently disclosed sleeves are suitable for use in various types of pinch valves such as for example the pinch valve described in U.S. Pat. No. 8,894,035.

Figure 1:
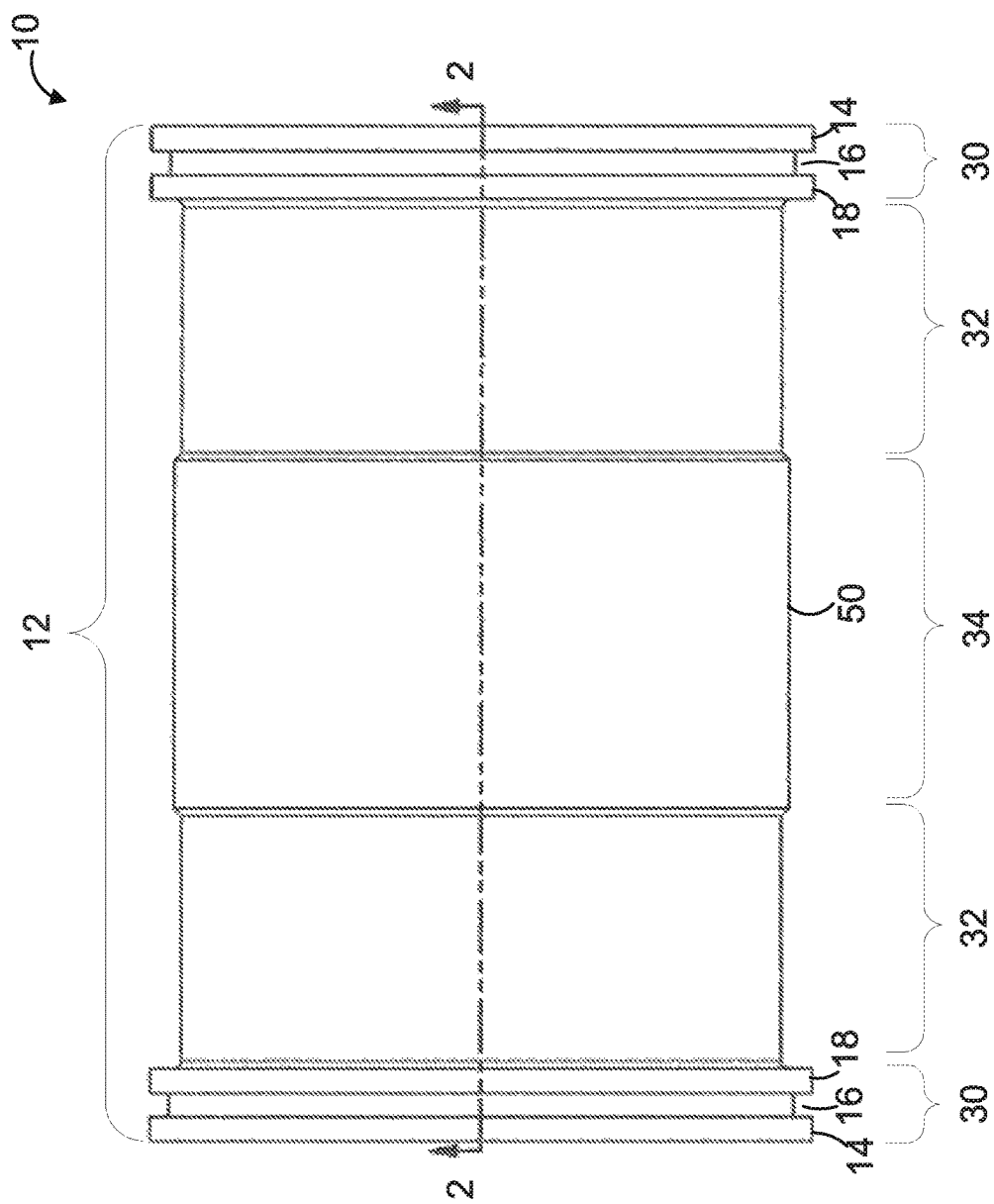
FIG. 1 is a front view of the sleeve for use in a pinch valve, in accordance with at least one embodiment.
Figure 2:
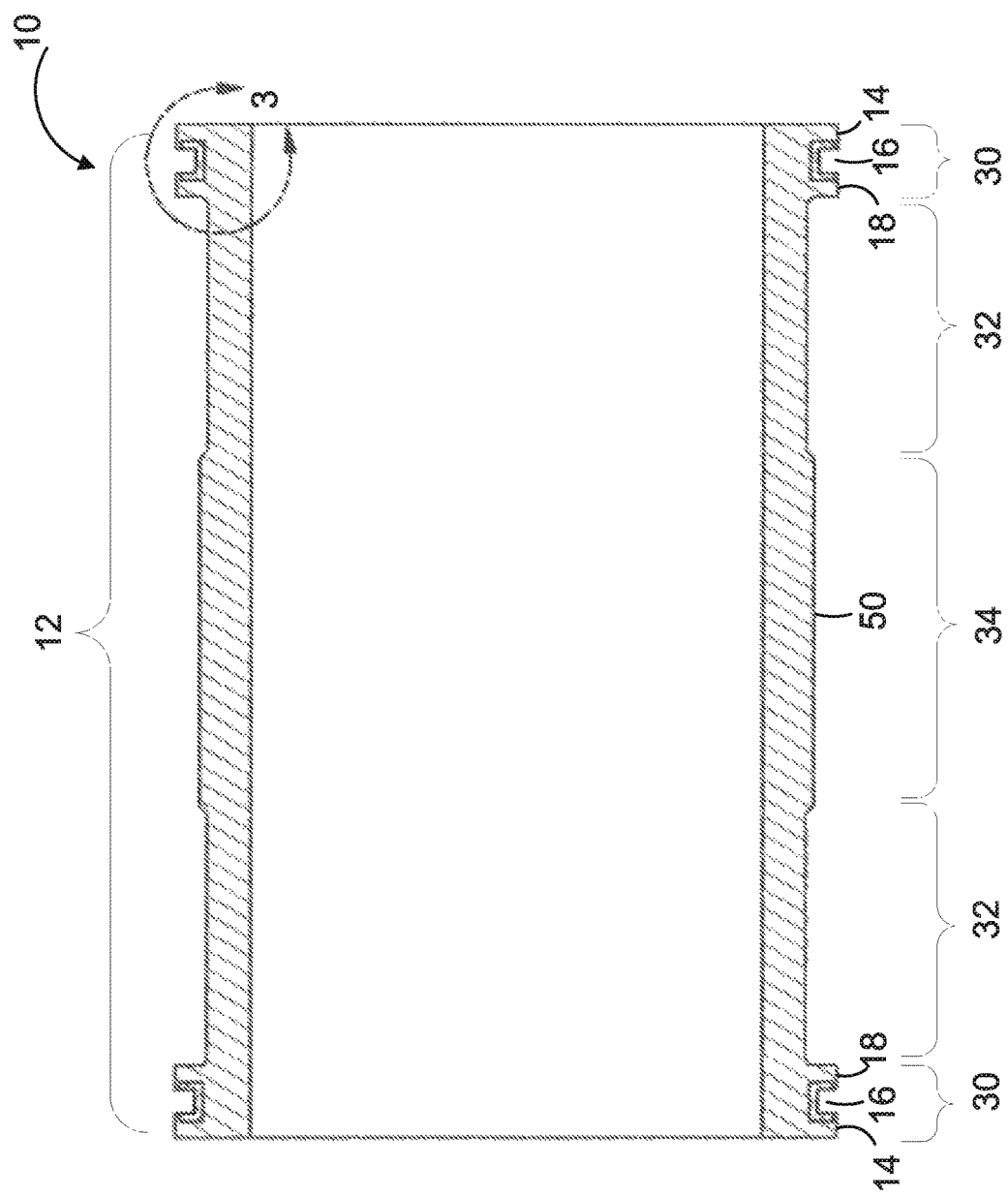
FIG. 2 is a cross-sectional view of the sleeve taken along the line 2-2 of FIG. 1, in accordance with at least one embodiment.

Referring now to the drawings, FIG. 1 is a front view of a sleeve 10 for use in a pinch valve. FIG. 2 is a cross-sectional view of the sleeve 10 along its transversal axis. The sleeve 10 comprises an at least substantially tubular element 12 having opposite ends and having a retaining section 30, a mid-body section 34 and sections 32 comprised between the retaining section 30 and the mid-body section 34.

The tubular element 12 is made of resilient materials and is capable of being compressed for reducing or restricting a flow therethrough, depending on the intended purpose. The sleeve can withstand repeated compression and decompression while maintaining its shape and when the sleeve becomes worn out, it can be removed from the pinch valve body and replaced.

Figure 3:
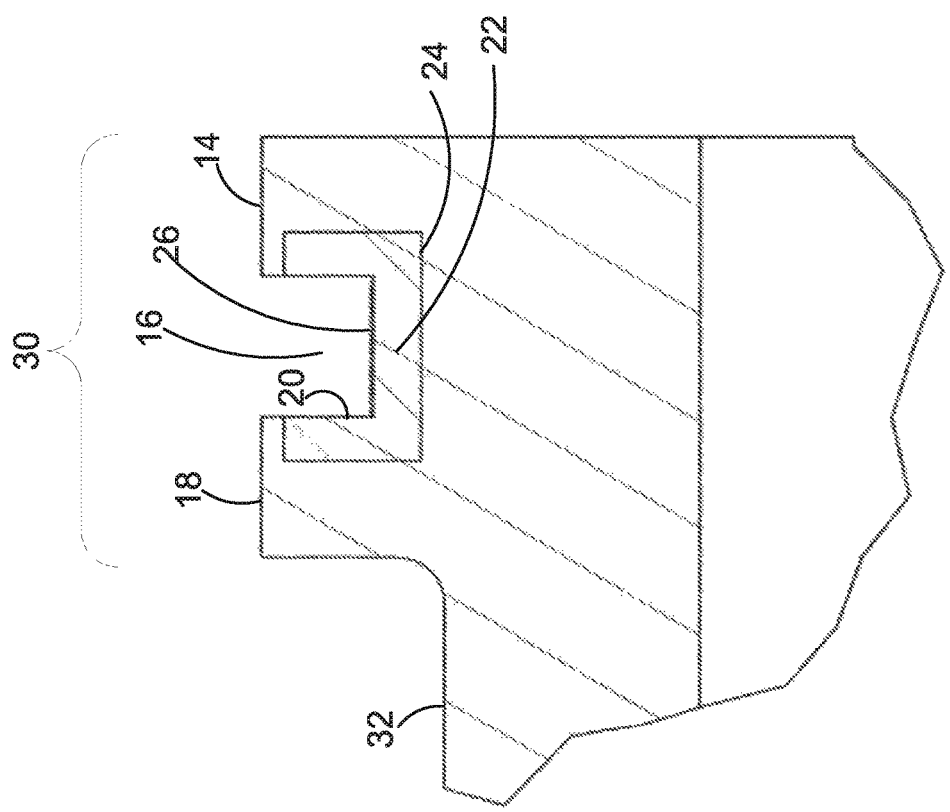
FIG. 3 is an enlarged view of the end portion of the tubular element as identified in FIG. 2, in accordance with at least one embodiment.

The retaining section 30 is the portion of the tubular element that mates with the valve rim portion of the pinch valve. As shown in FIGS. 1 to 3, and particularly in FIG. 3, the retaining section 30 comprises an annular end flange 14 mounted on the end of the tubular element 12. The annular end flange 14 is configured to sealingly engage with a valve rim section of the pinch valve to prevent leaking of material therebetween. Upon compression of the valve rim around the sleeve, a static seal is formed between the annular end flange 14 and the valve rim. Depending on the configuration of the valve pinch and corresponding external conduits, the annular end flanges 14 may also sealingly engage with the ends of the external conduits (not shown).

Now, referring to FIG. 2 and in particular FIG. 3, the retaining section of the tubular element 30 further comprises an annular groove 16 defined between the annular end flange 14 and an annular projection 18. The annular projection 18 extends radially outwardly from the tubular element 12.

As shown in FIG. 3, within the annular groove 16, an annular railing 20 is inserted. The annular railing 20 comprises annular railing walls and an annular railing base 22.

The annular railing 20 is made of a sturdy and substantially non-resilient material. For example, the annular railing is made of metal. Preferably, the metal annular railing is made of a non-rusting metal such as stainless steel.

For example, the annular railing 20 can be bonded within the annular groove 16. It will be understood that known methods for securely bonding the annular railing 20 within the annular groove 16 can be used. For example, the annular railing can be bonded by vulcanizing or by using a suitable adhesive.

The annular railing 20 is dimensioned for receiving a valve flange for retaining engagement therewith. For example, in the present embodiment, the annular railing 20 is housed within the annular groove 16 such that both the annular railing 20 and annular groove 16 are shaped to securely mate with the valve flange.

In FIGS. 2 and 3, the annular end flange 14 and annular projection 18 are shown as having similar radial height (or diameter e.g. outer diameter) and longitudinal width or thickness, however it will be noted that other embodiments can be envisaged in which the heights (diameters) and thicknesses are different, so long as the dimensions are suitable for creating an annular groove 16 that can accommodate an annular railing 20 suitable for securely retaining the valve flange.

The railing base 22 has an innermost diameter 24 and an outermost diameter 26. The outermost diameter 26 is greater than the outermost diameter of a section of the tubular element adjacent to the annular projection 32.

In an embodiment, as shown in FIG. 3, the innermost diameter 24 and the outermost diameter 26 of the railing base 22 are greater than the outermost diameter of the section of the tubular element adjacent to the annular projection 18.

The tubular element 12 may comprise a reinforced annular section 50 located in the mid-body section of the tubular element 34. The reinforced annular section 50 has the shape of an annular strip or band extending outwardly radially from the tubular element 12. In this embodiment, the compressing action of the pinch valve is applied on the reinforced annular section 50. As shown in FIG. 2, the reinforced annular section 50 has an outer diameter that is greater than the outer diameter of the sections of the tubular element adjacent to it 32.

In an alternative embodiment, it is provided herein a sleeve further comprising an additional seal for preventing leaking of material in the event that the seal formed between the annular end flange and the valve rim is compromised.

Figure 4:
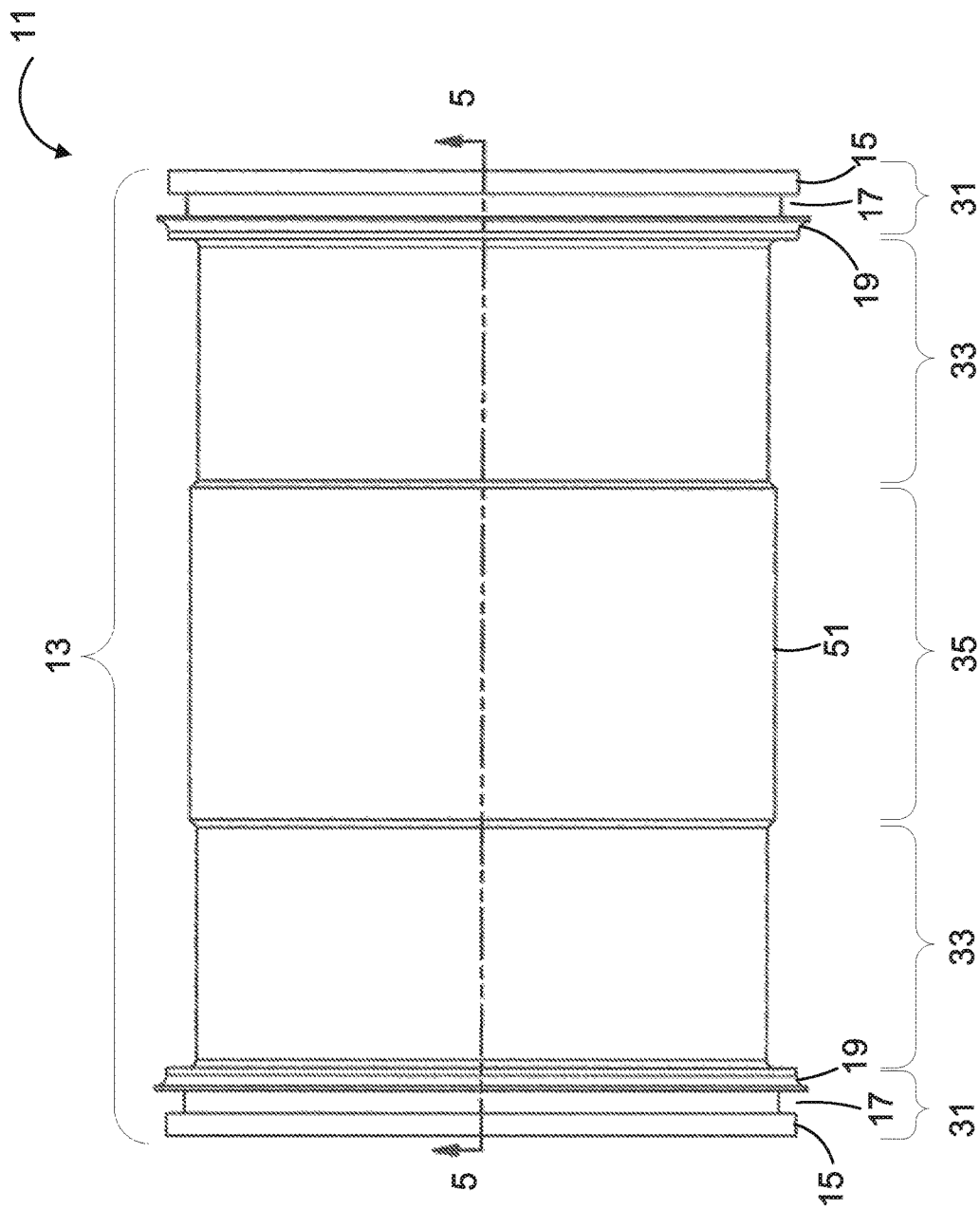
FIG. 4 is a front view of an alternative embodiment of the sleeve.
Figure 5:
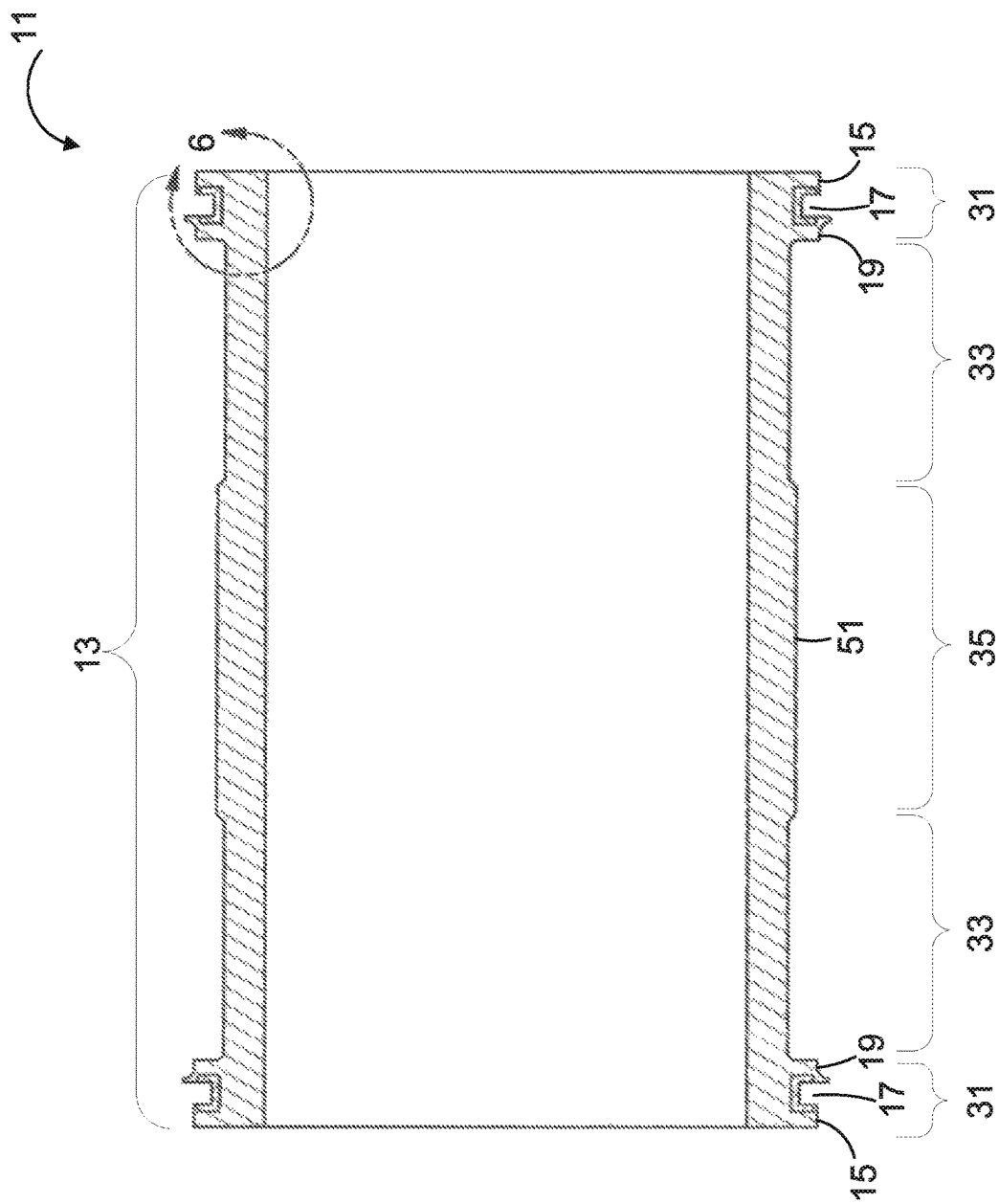
FIG. 5 is a cross-sectional view of the sleeve taken along the line 5-5 of FIG. 4, in accordance with at least one embodiment.

Accordingly, as shown in FIGS. 4 to 6 and more particularly in FIG. 6, there is provided a sleeve 11 for use in a pinch valve further comprising an annular lip member 40 extending radially outwardly from the annular projection 19 for sealingly engaging the valve rim.

The sleeve 11 is similar to the previously described sleeve 10. The sleeve 11 comprises a resilient and at least substantially tubular element 13 having opposite ends and is capable of being compressed for reducing or restricting a flow therethrough. As shown in FIGS. 4 and 5, the tubular element 13 has a retaining section 31, a mid-body section 35 and sections 33 comprised between the retaining section 31 and the mid-body section 35.

Referring now to FIGS. 4 to 6, the retaining section 31 comprises an annular end flange 15 mounted on the end of the tubular element 13. The annular end flange 15 is configured to sealingly engage with a valve rim section of the pinch valve. The retaining section of the tubular element 31 further comprises an annular groove 17 defined between the annular end flange 15 and an annular projection 19. The annular projection 19 extends radially outwardly from the tubular element 13.

Within the annular groove 17, an annular railing 21 is inserted and is dimensioned for receiving a valve flange for retaining engagement therewith. The annular railing 21 comprises a railing base 23 having an innermost diameter 25 and an outermost diameter 27. The outermost diameter 27 is greater than the outermost diameter of a section of the tubular element adjacent to the annular projection 19.

In an embodiment, as shown in FIG. 6, the innermost diameter 25 and the outermost diameter 27 of the railing base 23 are greater than the outermost diameter of the section of the tubular element adjacent to the annular projection 19.

For example, the annular lip member 40 may be beveled away from the annular groove 17.

The tubular element 13 may comprise a reinforced annular section 35 similar to the previously described annular section 34. The reinforced annular section 35 has an outer diameter that is greater than the outer diameters of sections of the tubular element adjacent to it 33.

Similar to the tubular element 12, the tubular element 13 can be for example made of a composition comprising elastomers, polymers, reinforcing fibers, and mixtures thereof.

It will be noted that known methods for manufacturing the tubular elements 12, 13 herein disclosed can be used. For example, the tubular element can be manufactured by injection moulding technique. For example, the tubular element including the annular end flanges, the annular projections and the reinforced annular section can be single moulded.

While a description was made with particular reference to the specific embodiments, it will be understood that numerous modifications thereto will appear to those skilled in the art.

The scope of the claims should not be limited by specific embodiments and examples provided in the present disclosure and accompanying drawings, but should be given the broadest interpretation consistent with the disclosure as a whole.

What is claimed is:

1. A sleeve for use in a pinch valve, the sleeve comprising:
 a resilient and at least substantially tubular element having opposite ends and capable of being compressed for reducing or restricting a flow therethrough;

a pair of annular end flanges, each annular end flange being mounted on each of the opposite ends and extending radially outwardly from the tubular element for sealingly engaging a valve rim;

a pair of annular grooves, each of the annular grooves being defined between the annular end flange and an annular projection, the annular projection extending radially outwardly from the tubular element, and a pair of annular railings inserted within the annular grooves, the annular railings being dimensioned for receiving a valve flange for retaining engagement therewith and comprising a railing base having an innermost diameter and an outermost diameter, the outermost diameter of the railing base being greater than an outermost diameter of a section of the tubular element adjacent to the annular projection.

2. The sleeve of claim 1, wherein the innermost diameter and the outermost diameter of the railing base are greater than the outermost diameter of the section of the tubular element adjacent to the annular projection.

3. The sleeve of claim 1, wherein the annular projection further comprises an annular lip member extending radially outwardly from the annular projection for sealingly engaging the valve rim.

4. The sleeve of claim 3, wherein the annular lip member is beveled away from the annular groove.

5. The sleeve of claim 1, wherein each of said pair of annular railing is made of metal.

6. The sleeve of claim 1, wherein the tubular element is made of a composition comprising elastomers, polymers, reinforcing fibers, and mixtures thereof.

7. The sleeve of claim 1, wherein the tubular element further comprises a reinforced annular section.

\* \* \* \* \*